W. S. FELKER.
TOOL FOR CURING, SPICING, AND SEASONING MEATS.
APPLICATION FILED JULY 23, 1914.
1,155,139. Patented Sept. 28, 1915.
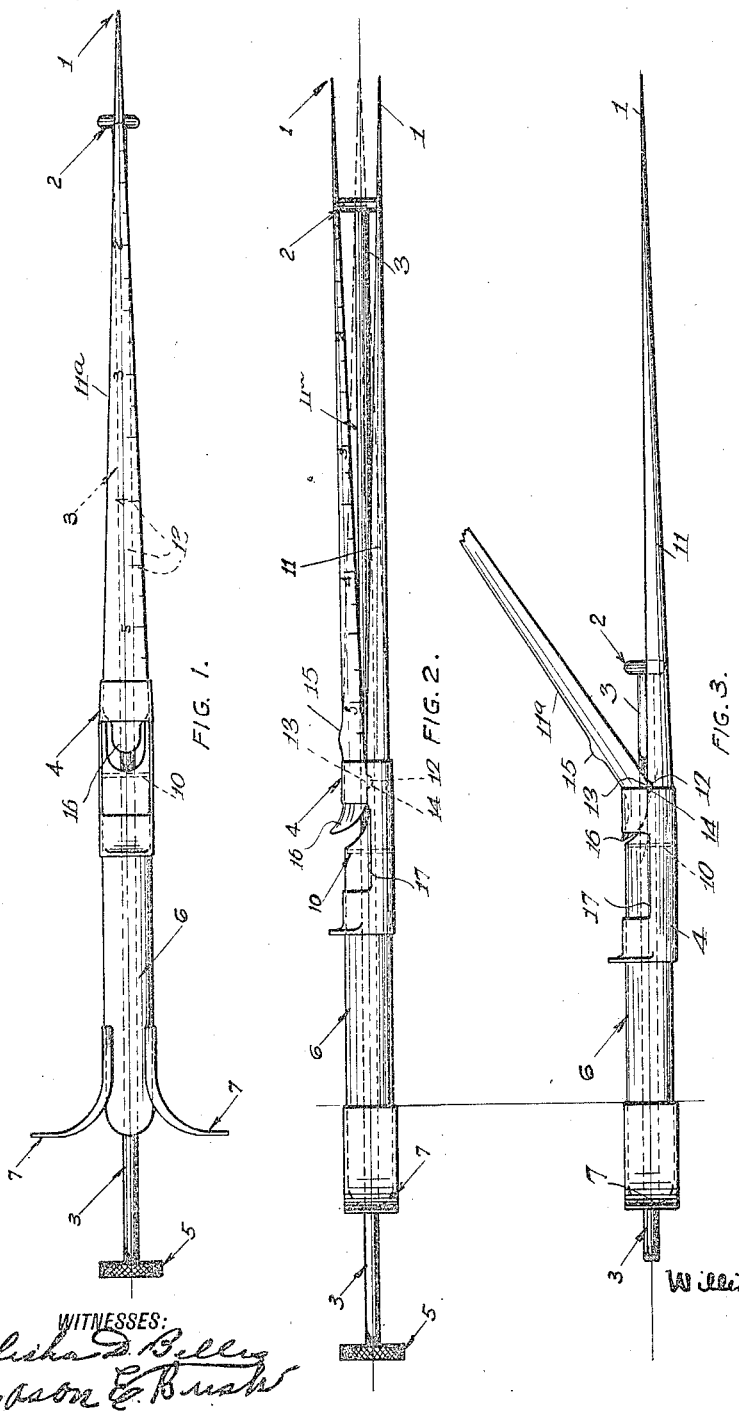
WITNESSES:
William S. Felker
INVENTOR

UNITED STATES PATENT OFFICE.

WILLIAM S. FELKER, OF MANCOS, COLORADO.

TOOL FOR CURING, SPICING, AND SEASONING MEATS.

1,155,139.

Specification of Letters Patent.

Patented Sept. 28, 1915.

Application filed July 23, 1914. Serial No. 852,758.

*To all whom it may concern:*

Be it known that I, WILLIAM S. FELKER, a citizen of the United States, residing at Mancos, in the county of Montezuma and State of Colorado, have invented certain new and useful Improvements in Tools for Curing, Spicing, and Seasoning Meats, of which the following is a specification.

This invention relates to certain new and useful improvements in instruments for the treatment of meats and like substances and contemplates more especially a tool for curing, spicing and seasoning meats.

An object of the present invention is to produce an instrument which can be readily forced into the meat under treatment without tearing, lacerating or otherwise mutilating it, and at the same time discharge the seasoning material within the meat in an efficient and highly beneficial manner.

Another object of this invention is the production of a meat treating instrument including uniformly tapered separable jaws having suitable graduations for correctly and uniformly measuring the depths to which the injections are to be made; and a discharging plunger reciprocally mounted within the said jaws and controlled by an operating element for spreading the said movable jaws at certain times in the delivery of the material as will more fully hereinafter appear.

With these and other objects in view the invention further consists in the combination and arrangement of the several parts hereinafter described and more particularly pointed out in the appended claims.

In the drawings: Figure 1 is a top plan view of the improved meat treating instrument. Fig. 2 is a side elevation thereof showing the jaws spread apart in full lines as when the plunger is operated to discharge the contents of the instrument, and in dotted lines when brought together for initially injecting the same into the meat, and, Fig. 3 is a similar view to Fig. 2 showing the retaining band retracted and the movable jaw elevated to receive the material to be injected.

The present invention is primarily intended for use in treatment of meats, as in the curing process, which latter is accomplished by injecting substances of refined salt and salt peter in proportion of about one pound salt to one-sixteenth ounce of salt peter, at regular intervals of uniform depths into the meat and then submerging the same in distilled water free from all traces of chlorin. After the salt has thoroughly penetrated the meat, the usual smoking and drying follows, thereby producing a rich, wholesome and well flavored product. The use of an instrument as herein described has proven highly advantageous in so treating meats, and its component parts will now be described in detail.

Referring to the drawings the said instrument comprises among other things a tubular body portion 6 provided at one end with the finger grips 7—7 and at the other end with a long tapering spring jaw 11 which is adapted to coöperate with a similar movable jaw 11$^a$ pivotally mounted at 12 in the larger portion of the jaw 11 near the body portion 6. This pivotal connection is obtained by the insertion of semi-circular lugs 13 formed on the jaw 11$^a$ fitting in corresponding recesses 14 provided in the jaw 11. By this construction it will be seen that the movable jaw can be opened and closed as occasions require for refilling the instrument with the material for the spicing and seasoning of the meat. These said jaws are preferably semi-circular in cross-section and tapered to a sharp point 1 as shown. In providing this form of tapering jaws it will be obvious that the instrument can be easily inserted within the meat without marking, scarring or otherwise disfiguring the same.

The small movable jaw 11$^a$ is preferably provided with an enlarged portion 15 and an upturned end 16 between which, one end of an engaging and retaining band 4 operates. This band is cut away as at 17 so as to accommodate the protruding end 16 of the movable jaw 11$^a$.

The operation of this band will be apparent. A movement thereof in the direction shown in Fig. 3 of the drawing will cause one end thereof to press the end 16 of the movable jaw 11$^a$ downwardly, thereby opening the jaw proper as shown. A movement in the opposite direction permits of the reverse action of the said jaw and it is closed as shown in Fig. 2. The opening of the jaw as just described is found to be advantageous when refilling the instrument for further injections.

Operating between the jaws 11 and 11$^a$ of the instrument is the piston or plunger head 2, the purpose of which is to eject the material after the instrument has been forced into the meat under treatment. The said plunger is operated by the rod 3 extending through a guide and stop 10 positioned in the body portion of the instrument. A suitable operating element 5 such as a button or the like is formed upon the end of the rod as shown.

In order to insure uniform depths in the injecting of the material within the substances to be treated, a scale or other like graduation 18 is provided upon the jaw 11ª as clearly shown in Fig. 1.

From the foregoing it will be obvious that an efficient and highly advantageous instrument is provided, capable of readily receiving the material to be injected and of being easily inserted into the meat, and there, caused to discharge the said material at regular and uniformly predetermined depths and distances for the purpose specified.

Having thus described my invention what I claim and desire to secure by Letters Patent is:

1. A meat seasoning tool including in combination a movable tapered jaw, another tapered jaw co-acting with the said movable jaw, and discharging means positioned between the said jaws and movable therein.

2. A meat seasoning tool including in combination a movable tapered jaw, another tapered jaw co-acting with the said movable jaw and means including a reciprocating plunger positioned between the said jaws for discharging the contents thereof.

3. A meat seasoning tool including in combination a body portion having a tapering jaw extending therefrom, a movable jaw adapted to co-act with the first mentioned jaw and means movable upon the said body portion for separating the jaws.

4. A meat seasoning tool including in combination a body portion having a tapering jaw extending therefrom, a movable jaw pivotally mounted upon the said body portion and adapted to co-act with the first mentioned jaw, and means including a movable sleeve arranged to engage one end of the said movable jaw for opening and closing the same.

5. A meat seasoning tool comprising a body portion having a tapering jaw extending therefrom, a similarly arranged movable jaw adapted to co-act with the first mentioned jaw, graduations provided on one of said jaws, a reciprocating plunger positioned between the said jaws, and a retaining sleeve slidably mounted upon the said body portion for opening and closing the said jaws.

Signed at Omaha, in the county of Douglas, State of Nebraska, this 18th day of July, 1914.

WILLIAM S. FELKER.

Witnesses:
 ELISHA D. BELLIS,
 JOHN W. HALL.